(12) United States Patent
Crawford

(10) Patent No.: US 6,729,039 B2
(45) Date of Patent: May 4, 2004

(54) PROCESS DEHUMIDIFIER REGENERATION CONTROL METHOD AND APPARATUS

(75) Inventor: Robert R. Crawford, Stafford, VA (US)

(73) Assignee: Universal Dynamics, Inc., Woodbridge, VA (US)

( * ) Notice: Subject to any disclaimer, the term of this patent is extended or adjusted under 35 U.S.C. 154(b) by 0 days.

(21) Appl. No.: 10/311,472

(22) PCT Filed: Jun. 18, 2001

(86) PCT No.: PCT/US01/41020
§ 371 (c)(1),
(2), (4) Date: Jul. 21, 2003

(87) PCT Pub. No.: WO01/96798
PCT Pub. Date: Dec. 20, 2001

(65) Prior Publication Data
US 2004/0040172 A1 Mar. 4, 2004

Related U.S. Application Data

(60) Provisional application No. 60/211,973, filed on Jun. 16, 2000.

(51) Int. Cl.[7] .................................................. F26B 3/00
(52) U.S. Cl. ............................... 34/343; 34/330; 34/62; 34/80; 95/119; 95/120; 96/130; 96/135; 96/136
(58) Field of Search .......................... 34/330, 332, 343, 34/345, 62, 79, 80; 95/117, 118, 119, 120, 121; 96/130, 131, 132, 133, 135, 136, 140, 141

(56) References Cited

U.S. PATENT DOCUMENTS

| | | | | |
|---|---|---|---|---|
| 4,023,940 A | * | 5/1977 | Shultz | 96/112 |
| 4,601,114 A | * | 7/1986 | Noguchi | 34/473 |
| 4,898,599 A | * | 2/1990 | Settlemyer | 95/92 |
| 5,123,277 A | * | 6/1992 | Gray et al. | 73/29.01 |
| 5,485,686 A | * | 1/1996 | Sears, Jr. | 34/473 |
| 5,926,969 A | | 7/1999 | Crawford et al. | |
| 6,226,888 B1 | | 5/2001 | Lang | |

* cited by examiner

Primary Examiner—Ira S. Lazarus
Assistant Examiner—Kathryn S. O'Malley
(74) Attorney, Agent, or Firm—Crowell & Moring LLP

(57) ABSTRACT

A method and an apparatus for controlling airflow in a desiccant drying system having two desiccant beds (10, 12). A first diverter valve (14) communicates with each of the desiccant beds, a regeneration air inlet (22), and a press air outlet (20). A second diverter valve (16) communicates with each of the desiccant beds, a process air inlet (18), and a regeneration air outlet (28). First and second regeneration air control valves (24, 30) are also provided which during a cooling phase of the regeneration cycle admit a cooling bleed stream of process air to the desiccant bed being regenerated and then convey the cooling air bleed stream from the desiccant bed and through a heat exchanger (42) back to the process air inlet.

20 Claims, 1 Drawing Sheet

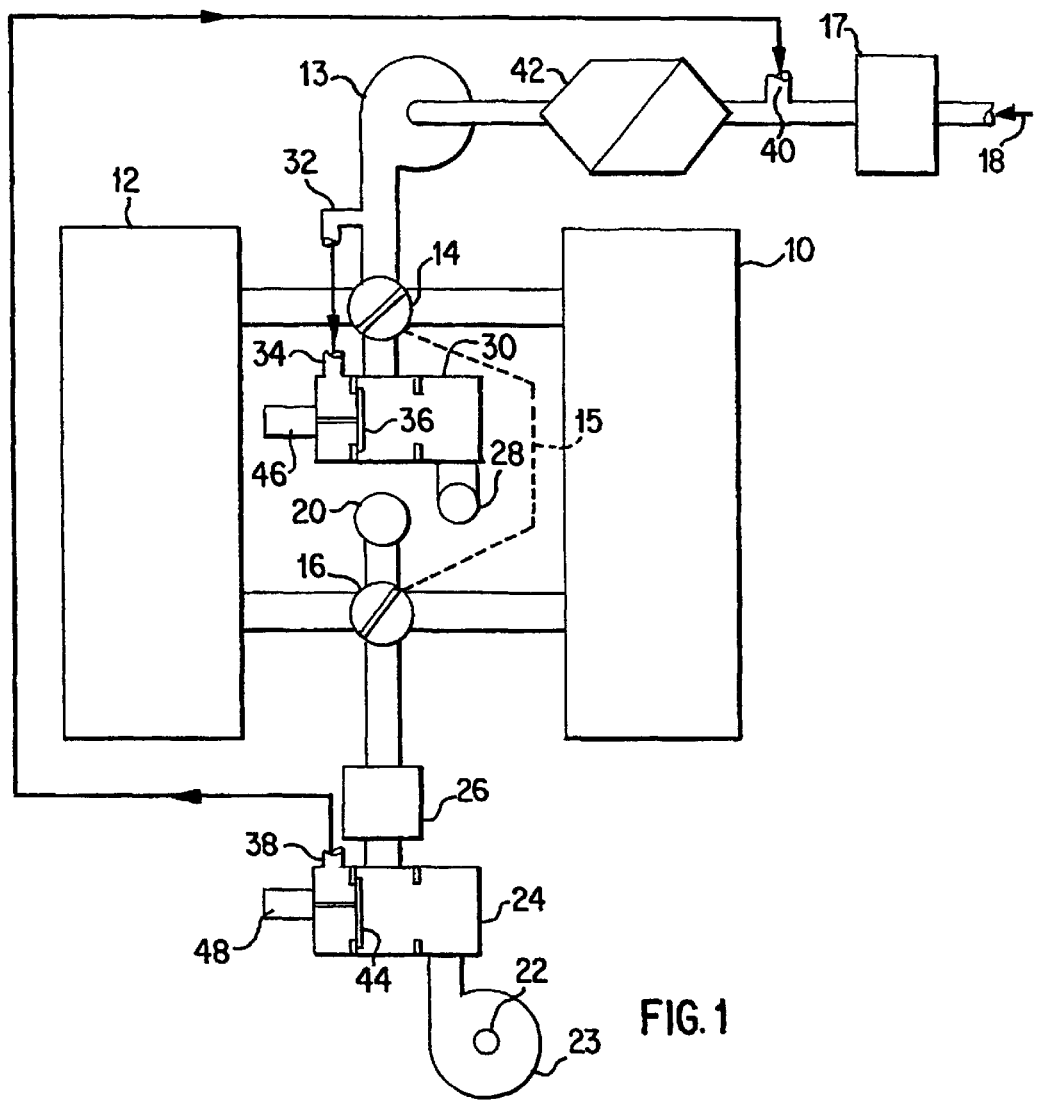
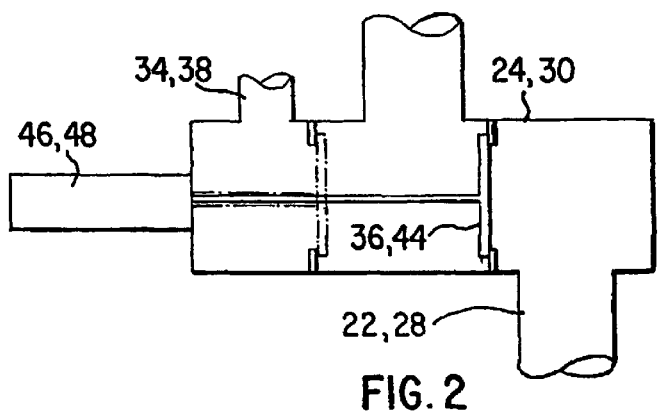

PROCESS DEHUMIDIFIER REGENERATION CONTROL METHOD AND APPARATUS

CROSS-REFERENCE TO RELATED APPLICATIONS

This application claims priority of U.S. provisional patent application No. 60/211,973, filed Jun. 16, 2000.

BACKGROUND OF THE INVENTION

This invention relates to a method and a system for controlling airflow in a multiple bed desiccant drying system, particularly in a twin tower desiccant dehumidifier, and particularly during a regeneration phase, and during transition periods between phases.

Multiple desiccant bed systems used for drying a synthetic plastic material are known, in which a moisture-laden gas stream is formed as the exit gas from a hopper in which plastic granules are dried by a stream of drying air. During an adsorption phase, the exit gas from the hopper is conducted through one or more drying vessels filled with an adsorption medium, whereby the adsorption medium extracts the moisture from the gas so that the resulting dry gas can be used again as a drying gas for drying plastic granules.

When the adsorption medium in a drying vessel is saturated with moisture, the drying vessel is transferred to a regeneration phase in which heated ambient air is conducted through the adsorption medium which takes up and carries away the moisture which was adsorbed therein. The ambient air used to dry the adsorption medium typically itself contains moisture, which increases the drying time required to regenerate the adsorption medium.

Since the adsorption medium is heated during the regeneration phase by the heated regeneration air, the adsorption medium typically must subsequently be cooled with a cooling air flow prior to a transition to the adsorption phase. If moisture-laden ambient air is used as the cooling air, the adsorption medium will adsorb the moisture therefrom, reducing the efficiency (i.e. dryness) of the regeneration process.

By using a multiple bed system, the drying process can be continued essentially without interruption, by utilizing one or a portion of the beds for adsorption, while simultaneously regenerating other of said beds, by appropriately channeling the process air flow.

Prior art twin tower dehumidifiers typically use two four-way valves to divert the respective air streams to the process and regeneration desiccant towers. This is done by porting the left and right sides of the four way valve to the desiccant towers, and by using the top port for the process air and the bottom port for the regeneration air. In this manner twin tower units are constructed for simple selection of the process airflow to one tower and the regeneration airflow to the other tower. The control of regeneration heating is limited to turning the regeneration fan and heater on.

An alternate method of construction for a twin tower adsorber system is to use a poppet type valve that will divert a central, process air inlet port to the left or right tower, and will then "bleed" a fixed airflow for the regeneration of the opposite tower. In this "bleed" method of regeneration with a continuous regeneration airflow, the control of the regeneration is limited to applying heat, with no control of the airflow.

Multiple desiccant tower dehumidifiers typically use a rotating "carousel" which holds the desiccant towers. In these systems the control of the regeneration is governed by the rotation of the desiccant system and is limited to the progressive rotation of the towers from one stage to the next. There is no individual control of the regeneration airflow with this type of unit. Heating of the desiccant is normally accomplished by the use of an external heating unit with the regeneration airflow conveying the necessary heat into the desiccant tower.

Conventional multi-tower desiccant bed dehumidifier controls utilize a single point proportional integral derivative (PID) anticipating temperature controller in which a thermocouple at the heater unit outlet measures the result of the control operation and feeds this result back to the controller. The controller uses this feedback to make adjustments to the heater operation by balancing the heater on-off cycles accordingly. Such control systems are sensitive to inlet air temperature variations and thus are subject to the drawback that they are limited in the amount of inlet air temperature disruption they can manage without unacceptable temperature variations appearing at the process air outlet. Experience has shown that an inlet air temperature variation of ±10° C. (±18 to 20° F.) over a few minutes will disrupt such a controller to such an extent that unacceptable temperature fluctuations will occur in the process air stream. Since the inlet air temperature variations of as much as 55° C. (100° F.) typically occur when the towers of a twin tower desiccant bed dehumidifier are switched between the adsorption and regeneration phases, exchange of the towers results in an interruption of processing due to a loss of process of control and requires a restabilization period before processing can resume.

In commonly owned U.S. Pat. No. 5,926,969 to Crawford et al., the entire disclosure of which is expressly incorporated by reference herein, a system and method of operation is disclosed in which two towers are connected by a 4-valve system. The 4-valve system is controlled such that the process air stream is progressively moved from the saturated bed to the regenerated bed. In that invention the terminal disruption of the dewpoint is minimized by any residual heat that remains in the fresh tower being brought online.

A further improvement is described in commonly owned, prior U.S. patent application No. 09/554,680 to Crawford, the entire disclosure of which is also expressly incorporated herein by reference. This improvement to the twin tower desiccant dehumidifier uses a split air stream from the inlet to the system as the cooling medium. In a typical closed loop process system, this inlet air stream has a much lower water content than the ambient air used for regeneration heating. The benefit of this improvement to the regeneration cooling of the desiccant was developed through use of the relative dry process return air as the desiccant cooling medium. While this is a successful method of operation, it has required the use of closed loop control for the management of the cooling air stream to avoid disruption of the process air quality. This is accomplished by the use of modulating control of the four-way dry air control valves of the dehumidifier with monitoring instruments to assure the proper control of the process. As in most industrial processes, the economics of the process system are under substantial discussion, and a premium is placed on reduction of costs for the equipment. Since the control costs are a major concern, there has remained a need for a different method of air control which would enable a less expensive control system to develop equal or greater process performance.

In previously known drying systems, a problematic issue is disruption of the process air temperature and dew point quality when changing from the saturated tower to the freshly regenerated tower. Furthermore, in previously known drying systems, bringing a heat exchanger online at the appropriate time without undue complexity of valves is a known problem. As an additional issue, previously known drying systems may be contaminated by room air during diverter valve changes. In addition, since the common instrumentation used to determine the dryness of the process air stream may require from 30 to 60 minutes to recover from the exposure to a high intermittent dewpoint, it is difficult to determine and monitor the humidity level of the process air in previously known drying systems.

SUMMARY OF THE INVENTION

In view of the above, there is a need for an improved method and a system for controlling airflow in a multiple bed desiccant drying system.

There is also a need for a method and a system which can is be implemented in existing multiple bed desiccant drying systems with a minimum of components, effort, and cost.

There is a particular need for a regeneration air control method and system which can maintain adequate process air temperature and dew point stability while cycling of desiccant towers between adsorption and regeneration phases of operation.

There is also a need for a regeneration air control method and system which shields the desiccant beds against undesired exposure to atmospheric moisture.

These and other needs have been met according to a first aspect of the present invention by providing a method for controlling airflow in a desiccant drying system comprising first and second desiccant beds; a first diverter valve communicating with each of the desiccant beds; a regeneration air inlet and a process air outlet; a second diverter valve communicating with each of said desiccant beds, a process air inlet and a regeneration air outlet; a first regeneration air control valve interposed between the regeneration air inlet and the first diverter valve; a second regeneration air control valve interposed between the second diverter valve and the regeneration air outlet; at least one heater for heating regeneration air prior to passage of the regeneration air through the desiccant bed; a first cooling bleed stream line connected between the process air inlet and the second regeneration air control valve; and a second cooling bleed stream line leading from the first regeneration air control valve back to the process air stream; said method comprising the steps of (a) regenerating a first of one of the beds by moving the first diverter valve to a position in which the first desiccant bed communicates with the regeneration air inlet and the second desiccant bed communicates with the process air outlet, and moving the second diverter valve to a position in which the first desiccant bed communicates with the regeneration air outlet and the second desiccant bed communicates with the process air inlet; and (b) subsequently cooling the first bed by moving the second regeneration air control valve to a position in which a process air bleed stream is passed from the process air inlet through a first cooling bleed stream line, the second regeneration air control valve and the second diverter valve to the first desiccant bed to extract heat from the first desiccant bed, and moving the first regeneration air control valve to a position in which the process air bleed stream after passing through the first bed is passed through the first diverter valve and the first regeneration air control valve and returned to the process air stream.

In accordance with another aspect of the invention, the foregoing needs are satisfied by providing a desiccant drying system, comprising first and second desiccant beds, a first diverter valve communicating with each of the desiccant beds, a regeneration air inlet and a process air outlet; a second diverter valve communicating with each of the desiccant beds, a process air inlet and a regeneration air outlet; a first regeneration air control valve interposed between the regeneration air inlet and the first diverter valve; a second regeneration air control valve interposed between the second diverter valve and the regeneration air outlet; at least one heater for heating regeneration air prior to passage of the regeneration air through the desiccant bed; a first cooling bleed stream line connected between the process air inlet and the second regeneration air control valve; and a second cooling bleed stream line leading from the first regeneration air control valve back to the process air stream; in which the second regeneration air control valve in one position blocks the first cooling bleed stream line and in a second position allows a bleed stream of cooling process air to pass through the first cooling bleed stream line, the second regeneration air control valve and the second diverter valve to a desiccant bed to be cooled; and in which the first regeneration air control valve in one position blocks the second cooling bleed stream line, and in a second position allows the bleed stream of cooling air to pass from the desiccant bed to be cooled through the first diverter valve and the first regeneration air control valve back to the process air stream.

The present invention utilizes a pair of three-way poppet valves at the inlet and the outlet of the regeneration air circuit. This enables relatively dry process air to be diverted through a cooling air loop to cool the hot desiccant at the completion of the desiccant regeneration heating cycle. When the heating period has ended, the regeneration air control valve will shift to block the ambient air access and divert a bleed stream of relatively dry process air through the hot, dry desiccant to effect cooling. The air flow for this bleed is controlled by the size of the port orifice to control the rate of cooling. This method makes use of the process air intake cooling coil heat exchanger or cooling coil, which is commonly found in many higher performance desiccant systems, to lower the temperature of the hot effluent of the freshly purged desiccant bed. The exact volume of cooling air is not critical to the successful operation of the system since the heat exchanger removes the additional energy before the combined air enters the "on line" desiccant bed. At the end of the regeneration cooling period, the temperature and dew point performance of the purged bed has equalized with the used desiccant bed, and a seamless changeover of the multiple tower, four-way diverter valves can be made without disruption of the downstream process.

By introducing a multi ported valve in the regeneration airflow circuit, the present invention isolates the tower system from the ambient air that would otherwise enter the drying system while the diverter valves are in intermediate or indeterminate positions during tower exchange.

The present invention thus relates to a novel desiccant dehumidifier using a unique method of regeneration airflow control to optimize the cooling of a hot, purged desiccant bed before it is placed in the process flow. By directing a regulated flow of air from the closed loop adsorption system, it can be used to cool the purged desiccant without adversely affecting the process. In this way, the desiccant bed temperatures of the two beds can be equalized before the beds are switched between the adsorption and regeneration phases of operation without exposure of the regenerated desiccant bed to ambient moisture.

The present invention has the added benefit of expediting the cooling process to enable reduction in the size of the adsorption desiccant since the limitations of the purge heating and cooling cycle can be reduced by the use of this improvement. The present invention uses an orifice regulated cooling flow to maximize the rate of cooling without addition of high humidity ambient air as a cooling medium for the desiccant system.

High performance desiccant systems typically include a heat exchanger on the inlet of the desiccant adsorption system to depress the operating temperature of the desiccant system to a range where economical use of a particular sized adsorption device is afforded. An especially preferred construction of the present invention uses this heat exchanger in combination with the basic twin tower desiccant system as the core of the device, with the addition of two simple valves at the inlet and outlet of the regeneration air ports. These valves allow the intake and discharge of room air when the regeneration purge heating is engaged to remove the adsorbed water from the desiccant being regenerated. At the conclusion of the purge heating, these valves will be shifted to close the room air intake and outlet, while then connecting the lower side of the desiccant bed to be cooled with the intake of the current adsorption air heat exchanger. The upper side of the hot desiccant bed is connected to the discharge of the adsorption air blower, thereby providing a positive flow of dry air to the top of the hot desiccant bed which, after flowing through and cooling the regenerated desiccant bed, can be returned to the process air stream, e.g. by being recycled to the inlet of the process air heat exchanger. In this way, the present invention enables the cooling of the hot desiccant using relatively dry air from the closed loop process air stream without detrimentally affecting the dry air discharged from the on-line adsorption desiccant bed.

The regeneration control method and apparatus of the invention are capable of maintaining temperature stabilities of ±2° C. and dew point variations of less than ±10° C. at the process air outlet of a multi-tower desiccant bed dehumidifier during cycling of the desiccant towers between the adsorption and regeneration phases. Preferably the temperature stability is maintained at ±1° C. and the dew point is maintained at ±5° C.

The present invention may be either incorporated into new, or retrofitted to existing, twin tower desiccant dehumidifiers. The disruptive effects of changing the tower diverter valves of a conventional twin tower desiccant dehumidifier are substantially reduced. This is accomplished through the use of a multi port valve applied to the regeneration air circuit of the dehumidifier system.

BRIEF DESCRIPTION OF THE DRAWINGS

The invention will be described in further detail hereinafter with reference to preferred embodiments illustrated in the accompanying drawings in which:

FIG. 1 shows a schematic view of a drying system according to a preferred embodiment of the present invention; and FIG. 2 shows a view of a regeneration air control valve in the cooling position.

DETAILED DESCRIPTION OF PREFERRED EMBODIMENTS

Referring to FIG. 1, a first tower 10 and a second tower 12 of a twin tower desiccant dehumidifier are schematically shown, each of which contains an adsorption medium (i.e. desiccant) for removing moisture from a process gas, for example process air used to dry plastic pellets. Each of the first and second towers 10, 12 communicate with each of first and second four-way diverter valves 14, 16. The four-way diverter valves 14, 16 are controllable to a plurality of positions in order to direct airflow. In the positions shown in FIG. 1, the diverter valves 14, 16 direct airflow such that the first tower 10 is in a regeneration (i.e., drying) phase, while the second tower 12 is in an adsorption phase.

A process gas inlet 18 communicates with the first four-way diverter valve 14, which valve 14 is controllable to direct flow into either of the first tower 10 or the second tower 12. A blower 13 is provided to move the process air stream. Optionally a filter 17 may be provided on the process air inlet line to filter the process air. In the position shown in FIG. 1, the first valve 14 directs moist process gas, for example process air, entering the process gas inlet 18 into the second tower 12.

A process gas outlet 20 communicates with the second four-way diverter valve 16, which valve 16 is controllable to direct flow from either of the towers 10, 12 to said outlet 20. In the position shown in FIG. 1, the second valve 16 directs dried process gas from the second tower 12 to the process gas outlet 20.

As mentioned above, in FIG. 1 the second tower 12 is shown in the adsorption phase. The process gas outlet 20 and the process gas inlet 18 are connected in a circuit with a drying vessel, not shown, for example a drying hopper containing a material to be dried such as plastic pellets. The dried process gas exits the process gas outlet 20, picks up moisture as it passes through the material to be dried in the drying vessel, and returns via the process gas inlet 18, passing through the second desiccant tower 12 to be dried again.

As mentioned above, in FIG. 1 the first tower 10 is shown in the regeneration phase. A regeneration inlet 22 communicates with the second four-way diverter valve 16, with a first regeneration air control valve 24 and a heater 26 being interposed therebetween. The regeneration air stream is propelled by a blower 23. Although the heater 26 is illustrated between regeneration air control valve 24 and diverter valve 16, it is understood that a single heater may be arranged at any desired location between regeneration air intake 22 and diverter valve 16. Alternatively, within the scope of the invention, a separate heater may be provided for each desiccant chamber. Use of a separate heater associated with each desiccant chamber has the advantage that the diverter valve need not be constructed to withstand the elevated temperatures produced by the heater in the regeneration air.

In the illustrated preferred embodiment, regeneration gas, for example ambient air, entering the regeneration gas inlet 22 is heated by the heater 26, and is directed by the second valve 16, in the position shown in FIG. 1, into the first desiccant tower 10. The heated regeneration gas picks up moisture from the moist adsorption medium in the first desiccant tower 10, and is directed via the first diverter valve 14 to a regeneration gas outlet 28, which may communicate, for example, with the ambient atmosphere or with a heat exchanger for recovery of heat energy. A second regeneration air control valve 30 is disposed between the first diverter valve 14 and the regeneration gas outlet 28.

FIG. 2 shows an enlarged view of a regeneration air control valve 24, 30 with inlet/outlet 22, 28, bleed air port 34, 38, valve poppet or plunger 26, 44 and actuator 46, 48. During the regeneration heating phase, both of the first and second regeneration air control valves 24, 30 are in the position shown in FIG. 1 (shown in broken lines in FIG. 2) in which the valves are open to the room to allow gas to pass therethrough.

A process air bleed stream outlet 32 is provided between the process air blower and the first diverter valve 14. Bleed stream outlet 32 communicates with an air bleed port 34 on regeneration air control valve 30. During the regeneration heating phase, when the plunger 36 of regeneration air control valve 30 is in the position depicted in FIG. 1, the bleed stream connection formed by bleed stream outlet 32 and air bleed port 34 is closed off, so that no bleed stream of process air passes therethrough.

Similarly, regeneration air control valve 24 is provided with an air bleed port 38, which in turn is connected to an inlet 40 on the process air line upstream of heat exchanger 42. When the plunger 44 of regeneration air control valve 24 is in the position shown in FIG. 1, then this bleed stream connection is also closed off so that no bleed stream can flow therethrough.

After the adsorption medium in the first tower 10 has been de-moisturized to a desired extent, the adsorption medium needs to be cooled in order to avoid temperature disruptions when switching the first tower 10 to the adsorption phase. With regard to this regeneration cooling phase, simply turning off the heater 26 and running regeneration gas (e.g. moist ambient air) through the first tower 10 has the above-noted disadvantage of moistening the adsorption medium therein with ambient moisture from air drawn in through regeneration air inlet 22 and consequently reducing the efficiency of the regeneration cycle.

Accordingly, during the cooling phase, heater 26 is turned off and both regeneration air control valves 24, 30 are switched to their "second" position, shown in solid lines in FIG. 2, and both four-way diverter valves 14, 16 are switched to a fully sealed position. In this position, a bleed stream of comparatively dry process air passes from bleed stream outlet 32 through air bleed port 34 and regeneration air control valve 30 to diverter valve 14, from whence it is directed back through desiccant tower 10 to extract heat from the adsorption medium contained therein. This cooling bleed stream then exits from desiccant tower 10 and is directed by diverter valve 16 through regeneration air control valve 24 to air bleed port 38, from whence is returned to the process air stream.

In the illustrated preferred embodiment, the cooling bleed stream is conveyed from air bleed port 38 through a second cooling bleed stream line to inlet 40 where it is re-introduced into the process air stream between inlet 18 and heat exchanger 42. Excess heat carried by the cooling air in this bleed stream is extracted from the system in heat exchanger 42. of course, the cooling bleed stream could be reintroduced to the process air stream at other locations within the scope of the invention.

The portion of the process gas which is diverted into the first tower 10 via the second diverter valve 16 picks up heat from the adsorption medium therein, and then passes via the first diverter valve 14 back-into the second tower 12. The complete closure of the first tower 10 off from the regeneration gas (e.g. moist ambient air) advantageously prevents the adsorption medium contained therein from picking up moisture during the cooling phase.

The regeneration air control valves 24, 30 allow the desiccant beds to be completely closed off from the ambient atmosphere. For example, when the machine is shut down, the regeneration air control valves may be closed to prevent the desiccant from picking up moisture from the ambient atmosphere. Accordingly, the present invention allows the desiccant beds to be maintained in a ready (i.e., dry) state for instant use, whereas in conventional drying systems an additional start-up time is required for drying out the desiccant which has been exposed to the ambient atmosphere, which also requires additional energy. Likewise, when the drying system is being run below design capacity (i.e., when the regenerating tower is regenerated before the adsorbing tower is fully loaded), the desiccant in the regenerated tower can be maintained in its optimum dry condition by closing the regeneration air control valves 24, 30 while the adsorbing tower is extended to full load before switching over.

After the adsorption medium in the first tower 10 has been cooled to a desired temperature, at which time the adsorption medium in the second tower 12 may have become saturated, the first and second diverter valves 14, 16 are moved in position such that the first tower 10 enters the adsorption phase and the second tower 12 enters the regeneration phase. After diverter valves 14, 16 are moved to switch the first tower 10 to the adsorption phase and the second tower 12 to the regeneration phase, the first and second regeneration air control valves 24, 30 are shifted back to the position shown in FIG. 1 in which gas inlet 22 and gas outlet 28 are open to the atmosphere.

Since the closed cooling circuit is shut off from the ambient atmosphere, no moisture enters the system, which would disadvantageously moisten the dried adsorption medium. Furthermore, the heat exchanger advantageously expels the heat added to the system by the heater 26 during the heating portion of the regeneration cycle. Accordingly, the system of the invention advantageously minimizes both humidity and thermal disruptions of the system.

Important advantages of the invention include the fact that the cooling bleed stream is passed downwardly through the desiccant bed in the same direction of flow as the process gas during the adsorption cycle, whereas during the heating phase, the regeneration gas is passed upwardly through the desiccant bed. The cooling bleed stream also flows in a closed loop with no opportunity to mix with atmospheric air and pick up moisture from the ambient atmosphere, but there is no need for expensive instrumentation or complex flow controls to control the flow.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations within the scope of the appended claims and equivalents thereof.

What is claimed is:

1. A method for controlling airflow in a desiccant drying system comprising:

first and second desiccant beds, a first diverter valve communicating with each of said desiccant beds, a regeneration air inlet, and a process air outlet;

a second diverter valve communicating with each of said desiccant beds, a process air inlet, and a regeneration air outlet;

a first regeneration air control valve interposed between said regeneration air inlet and said first diverter valve;

a second regeneration air control valve interposed between second diverter valve and said regeneration air outlet;

at least one heater for heating regeneration air prior to passage of the regeneration air through the desiccant bed;

a first cooling bleed stream line connected between said process air inlet and said second regeneration air control valve; and a second cooling bleed stream line leading from said first regeneration air control valve back to the process air stream;

said method comprising the steps of:

(a) regenerating a first of said beds by moving said first diverter valve to a position in which said first desiccant bed communicates with said regeneration air inlet and said second desiccant bed communicates with said process air outlet, and moving said second diverter valve to a position in which said first desiccant bed communicates with said regeneration air outlet and said second desiccant bed communicates with said process air inlet;

(b) subsequently cooling said first bed by moving said second regeneration air control valve to a position in which a process air bleed stream is passed from said process air inlet through first cooling bleed stream line, said second regeneration air control valve and said second diverter valve to said first desiccant bed to extract heat from said first desiccant bed, and moving said first regeneration air control valve to a position in which said process air bleed stream after passing through said first bed is passed through said first diverter valve, and said first regeneration air control valve and returned to the process air stream.

2. A method according to claim 1, wherein process air and regeneration air are passed through each desiccant bed in opposite directions during adsorption and regeneration phases, respectively, and the bleed stream is passed through the desiccant bed in the same direction as the process air.

3. A method according to claim 1, further comprising filtering the process air.

4. A method according to claim 1, wherein the process air at the process air outlet is maintained within a temperature range of ±2° C. and has dew point variation of less than ±10° C. during cycling of desiccant towers between adsorption and regeneration phases.

5. A method according to claim 4, wherein the process air at the process air outlet is maintained within a temperature range of ±1° C. and has dew point variation of less than ±5° C. during cycling of desiccant towers between adsorption and regeneration phases.

6. A method according to claim 1, wherein said first and second diverter valves are actuated simultaneously.

7. A method according to claim 1, wherein said process air bleed stream is conveyed from said first regeneration air control valve through a second cooling bleed stream line to said heat exchanger.

8. A method according to claim 1, wherein the heater is disposed between said first regeneration air control valve and said first diverter valve.

9. A method according to claim 1, wherein a heat exchanger is interposed between the process air inlet and the second diverter valve, and the cooling bleed stream is conveyed by said second bleed stream line back to the process air stream upstream of said heat exchanger, whereby heat picked up by the bleed stream is removed in said heat exchanger.

10. A method according to claim 1, wherein a single heater is interposed between said regeneration air inlet and said first diverter valve for heating the regeneration air.

11. A desiccant drying system, comprising:

first and second desiccant beds;

a first diverter valve communicating with each of said desiccant beds, a regeneration air inlet, and a process air outlet;

a second diverter valve communicating with each of said desiccant beds, a process air inlet, and a regeneration air outlet;

a first regeneration air control valve interposed between said regeneration air inlet and said first diverter valve;

a second regeneration air control valve interposed between second diverter valve and said regeneration air outlet;

at least one heater for heating regeneration air prior to passage of the regeneration air through the desiccant bed;

a first cooling bleed stream line connected between said process air inlet and said second regeneration air control valve; and a second cooling bleed stream line leading from said first regeneration air control valve back to the process air stream;

wherein said second regeneration air control valve in one position blocks said first cooling bleed stream line and in a second position allows a bleed stream of cooling process air to pass through said first cooling bleed stream line, said second regeneration air control valve and said second diverter valve to a desiccant bed to be cooled; and wherein said first regeneration air control valve in one position blocks said second cooling bleed stream line, and in a second position allows the bleed stream of cooling air to pass from said desiccant bed to be cooled through said first diverter valve, and said first regeneration air control valve back to said process air stream.

12. A system according to claim 11, wherein process air and regeneration air are passed through each desiccant bed in opposite directions during adsorption and regeneration phases, respectively, and the bleed stream is passed through the desiccant bed in the same direction as the process air.

13. A system according to claim 11, further comprising a filter interposed between the process air inlet and second diverter valve.

14. A system according to claim 11, wherein the process air at the process air outlet is maintained within a temperature range of ±2° C. and has dew point variation of less than ±10° C. during cycling of desiccant towers between adsorption and regeneration phases.

15. A system according to claim 14, wherein the process air at the process air outlet is maintained within a temperature range of ±1° C. and has dew point variation of less than ±5° C. during cycling of desiccant towers between adsorption and regeneration phases.

16. A system according to claim 11, wherein said first and second diverter valves are operatively linked for simultaneous actuation.

17. A system according to claim 11, wherein said second cooling bleed stream line communicates between said first regeneration air control valve and a process air inlet line upstream of a process air blower for returning the process air bleed stream from the first regeneration air control valve back to the process air stream.

18. A system according to claim 11, wherein said heater is interposed between said first regeneration air control valve and said first diverter valve.

19. A system according to claim 11, further comprising a heat exchanger interposed between said process air inlet and said second diverter valve, and wherein said second cooling bleed stream line leads from said first regeneration air control valve to the process air stream upstream of said heat exchanger.

20. A system according to claim 11, wherein a single heater is interposed between said regeneration air inlet and said first diverter valve for heating the regeneration air.

* * * * *